(12) United States Patent
Bian et al.

(10) Patent No.: US 11,320,589 B1
(45) Date of Patent: May 3, 2022

(54) GRATING COUPLERS INTEGRATED WITH ONE OR MORE AIRGAPS

(71) Applicant: GLOBALFOUNDRIES U.S. Inc., Santa Clara, CA (US)

(72) Inventors: Yusheng Bian, Ballston Lake, NY (US); Siva P. Adusumilli, Burlington, VT (US); Bo Peng, Wappingers Falls, NY (US); Kenneth J. Giewont, Hopewell Junction, NY (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

(21) Appl. No.: 17/084,186

(22) Filed: Oct. 29, 2020

(51) Int. Cl.
| G02B 6/124 | (2006.01) |
| G02B 6/12 | (2006.01) |
| G02B 6/13 | (2006.01) |

(52) U.S. Cl.
CPC ............. G02B 6/124 (2013.01); G02B 6/13 (2013.01); *G02B 2006/12061* (2013.01); *G02B 2006/12107* (2013.01)

(58) Field of Classification Search
CPC .............. G02B 6/124; G02B 2006/12107
See application file for complete search history.

(56) References Cited

U.S. PATENT DOCUMENTS

| 7,777,250 | B2 | 8/2010 | Lochtefeld |
| 7,790,495 | B2 | 9/2010 | Assefa et al. |
| 7,795,064 | B2 | 9/2010 | Pan et al. |
| 8,625,942 | B2 | 1/2014 | Na et al. |
| 9,028,157 | B2 | 5/2015 | Na et al. |
| 9,064,699 | B2 | 6/2015 | Wang et al. |
| 9,864,138 | B2 | 1/2018 | Coolbaugh et al. |
| 10,157,947 | B2 | 12/2018 | Chen et al. |
| 10,795,082 | B1 * | 10/2020 | Jacob ................. G02B 6/12004 |
| 2003/0156325 | A1 * | 8/2003 | Hoshi ................. G02B 5/1809 |
| | | | 359/487.02 |
| 2004/0033003 | A1 * | 2/2004 | Liu ........................ G02B 6/124 |
| | | | 385/14 |
| 2007/0099315 | A1 | 5/2007 | Maa et al. |
| 2008/0070355 | A1 | 3/2008 | Lochtefeld et al. |
| 2011/0037133 | A1 | 2/2011 | Su et al. |
| 2014/0159183 | A1 | 6/2014 | Na |
| 2016/0155884 | A1 | 6/2016 | Hon et al. |

(Continued)

FOREIGN PATENT DOCUMENTS

CN        1184498 C    *  1/2005

OTHER PUBLICATIONS

Yusheng Bian et al., "Towards low-loss monolithic silicon and nitride photonic building blocks in state-of-the-art 300mm CMOS foundry", OSA frontiers in optics & laser science APS/DLS, FW5D. 2, Sep. 14-17, 2020, 2 pages.

(Continued)

*Primary Examiner* — Charlie Y Peng
(74) *Attorney, Agent, or Firm* — Francois Pagette; Andrew M. Calderon; Roberts Calderon Safran & Cole, P.C.

(57) ABSTRACT

The present disclosure relates to semiconductor structures and, more particularly, to grating couplers integrated with one or more airgap and methods of manufacture. The structure includes: a substrate material comprising one or more airgaps; and a grating coupler disposed over the substrate material and the one or more airgaps.

15 Claims, 11 Drawing Sheets

(56) References Cited

U.S. PATENT DOCUMENTS

2018/0204761 A1* 7/2018 Feilchenfeld ......... H01L 29/868

OTHER PUBLICATIONS

M. Selim et al., "Resonant Cavity enhanced photonic devices", Boston University, Department of Electrical, Computer and Systems Engineering and Center for Photonics Research, Boston, Massachusetts, Mar. 1995, 1 page.

D. Knoll et al., "High-Performance BiCMOS Si Photonics Platform", 2015 Bipolar/BiCMOS Circuitry and Technology Meeting, Oct. 26-28, 2015, 1 page.

Jae HYoung Ryu et al., "High performance of InGaN light-emitting diodes by air-gap/GaN distributed Bragg reflectors", Optics Express, Apr. 23, 2012, 1 page.

Huang et al., "Long Wavelength Resonant Cavity Photodetector Based on InP/Air-Gap Bragg Reflectors," IEEE Photonics Technology Letters, vol. 16, No. 1, pp. 245-247, Jan. 2004, 1 page.

Bian et al., "Towards low-loss monolithic silicon and nitride photonic building blocks in state-of-the-art 300mm CMOS foundry", date and publication unknown, 2 pages.

Specification and drawings in U.S. Appl. No. 16/515,779, filed Jul. 18, 2019, 17 pages.

Specification and drawings in U.S. Appl. No. 16/817,582, filed Mar. 12, 2020, 37 pages.

Specification and drawings in U.S. Appl. No. 16/842,080, filed Apr. 7, 2020, 29 pages.

Giewont et al., "300-mm Monolithic Silicon Photonics Foundry Technology", IEEE Journal of Selected Topics in Quantum Electronics, vol. 25, No. 5, Sep.-Oct. 2019, 12 pages.

Taillaert et al., "Compact efficient broadband grating coupler for silicon-on-insulator waveguides", Optics Letters, Dec. 1, 2004, vol. 29, No. 23, 3 pages.

Scheerlinck et al., "Efficient, broadband and compact metal grating couplers for silicon-on-insulator waveguides", Optics Express, Jul. 23, 2007, vol. 15, No. 15, 6 pages.

Zaoui et al., Cost-effective CMOS-compatible grating couplers with backside metal mirror and 69% coupling efficiency, Optics Express, Dec. 10, 2012, vol. 20, No. 26, 6 pages.

Rakowski et al., 45nm CMOS—Silicon Photonics Monolithic Technology (45CLO) for next-generation, low power and high speed optical interconnects, OFC 2020, 3 pages.

Laere et al., "Compact grating couplers between optical fibers and Silicon-on-Insulator photonic wire waveguides with 69% coupling efficiency", Department ofInformation Technology (INTEC), 2006 Optical Society of America, 3 pages.

Zaoui et al., "CMOS-Compatible Polarization Splitting Grating Couplers With a Backside Metal Mirror", IEEE Photonics Technology Letters, vol. 25, No. 14, Jul. 15, 2013, 4 pages.

Selvaraja et al., "Highly efficient grating coupler between optical fiber and silicon photonic circuit", Optical Society of America, 2009, 2 pages.

* cited by examiner

US 11,320,589 B1

GRATING COUPLERS INTEGRATED WITH ONE OR MORE AIRGAPS

FIELD OF THE INVENTION

The present disclosure relates to semiconductor structures and, more particularly, to grating couplers integrated with one or more airgaps and methods of manufacture.

BACKGROUND

An optical coupler is a component that couples light from an optical fiber to a waveguide structure. For example, an optical coupler can be a grating coupler used in silicon photonics to provide efficient coupling to silicon waveguides. But, the coupling efficiency of grating couplers are limited due to the light leakage into the underlying substrate.

To improve coupling efficiency, a reflector can be provided under the grating coupler to reflect light back into the waveguide structure so that the reflected light can be absorbed by the waveguide structure. For example, metallic mirrors made of noble metals, e.g., Au, or a distributed Bragg reflector (DBR) composed of vertically stacked multilayers of metal-oxides or polymer material, can be used to enhance grating coupler efficiency. However, such configurations are either incompatible with CMOS processes or require complicated fabrication steps. Hence, they cannot be easily and cost efficiently implemented on Si photonics platforms.

SUMMARY

In an aspect of the disclosure, a structure comprises: a substrate material comprising one or more airgaps; and a grating coupler disposed over the substrate material and the one or more airgaps.

In an aspect of the disclosure, a structure comprises: a bulk substrate material comprising one or more sealed airgaps within the bulk substrate material; a waveguide structure over the bulk substrate material; and a grating coupler optically coupled to the waveguide structure and disposed over the one or more airgaps.

In an aspect of the disclosure, a method comprises: forming one or more sealed airgaps in a bulk substrate material; and forming a grating coupler over the bulk substrate material and the one or more airgaps.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to grating couplers integrated with one or more airgaps and methods of manufacture. More specifically, the present disclosure includes grating couplers with an embedded airgap or array of airgaps formed in a bulk substrate or semiconductor on insulator (SOI) technologies. Advantageously, the present disclosure provides enhancement to the coupling efficiency of grating couplers.

In embodiments, the grating couplers can be fabricated using bulk Si wafers or SOI technologies. The grating couplers can be patterned polysilicon material or SiN material with integrated airgap(s) in the substrate under the grating couplers. The integrated airgap(s) can be a single, merged airgap or an array of airgaps. With the help of the airgap or array of airgaps, the peak wavelength can be shifted to a shorter wavelength, which helps relax fabrication constraints. In this way, there is no need to pattern small features that are below ground rules such as reflectors, etc. The airgaps can also be tuned to different shapes depending on the performance requirements of the grating couplers.

The grating couplers of the present disclosure can be manufactured in a number of ways using a number of different tools. In general, though, the methodologies and tools are used to form structures with dimensions in the micrometer and nanometer scale. The methodologies, i.e., technologies, employed to manufacture the grating couplers of the present disclosure have been adopted from integrated circuit (IC) technology. For example, the structures are built on wafers and are realized in films of material patterned by photolithographic processes on the top of a wafer. In particular, the fabrication of the grating couplers uses three basic building blocks: (i) deposition of thin films of material on a substrate, (ii) applying a patterned mask on top of the films by photolithographic imaging, and (iii) etching the films selectively to the mask.

Figure 1A:
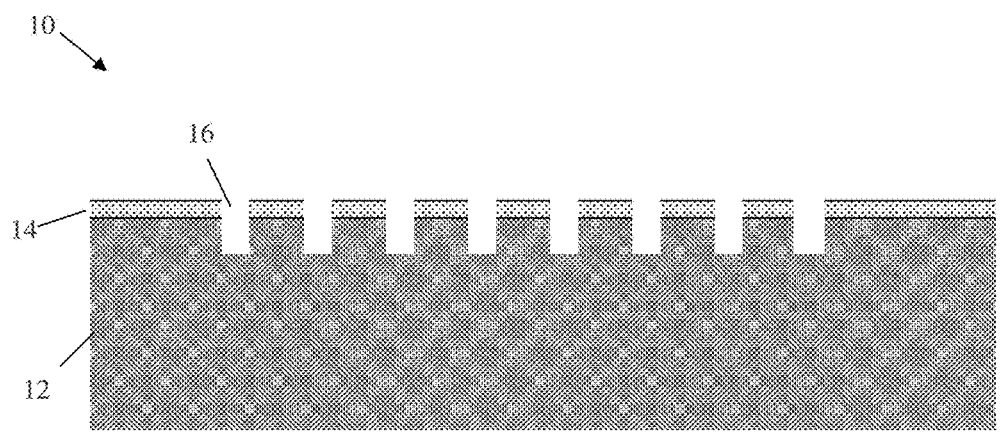
FIGS. 1A-1E show cross-sectional views of trenches and cavity structures in a substrate, amongst other features, and respective fabrication processes in accordance with aspects of the present disclosure.

FIGS. 1A-1E show cross-sectional views of trenches and cavity structures formed in a substrate, amongst other features, and respective fabrication processes in accordance with aspects of the present disclosure. More specifically, FIG. 1A shows an incoming structure 10 comprising a bulk substrate 12 composed of any suitable semiconductor materials such as, e.g., Si. One or more pad films 14, e.g., dielectric materials, is deposited on the substrate 12. For example, the pad films 14 can be oxide or nitride films or combinations of these or other dielectric materials. In embodiments, the pad film(s) 14 can be deposited by a conventional deposition process, e.g., chemical vapor deposition (CVD). By way of example, nitride can be deposited to a thickness of about 100 nm to 200 nm; whereas, oxide can be deposited to a thickness of about to 10 nm. In the case of Si substrates, the oxide can be formed from Si in furnace oxidizations of the Si material.

Still referring to FIG. 1A, openings or trenches 16 are patterned on the pad film(s) 14, followed by trench formation into the substrate 12. The trenches 16 can include "holes" and/or "bars". In embodiments, the trenches 16 can be formed by conventional lithography and etching processes. For example, a resist formed over the pad dielectric film(s) 14 is exposed to energy (light) to form a pattern (opening). An etching process with a selective chemistry, e.g., reactive ion etching (RIE), will be used to form one or more trenches 16 through the openings of the resist, through the pad film(s) 14, and into the substrate 12. The resist can then be removed by a conventional oxygen ashing process or other known stripants. The width of the trenches 14 can be determined by the lithography resolution. In one illustrative non-limiting example, the trenches 14 can be 120 nm wide and 0.7 micron deep into the substrate 12.

Figure 1B:
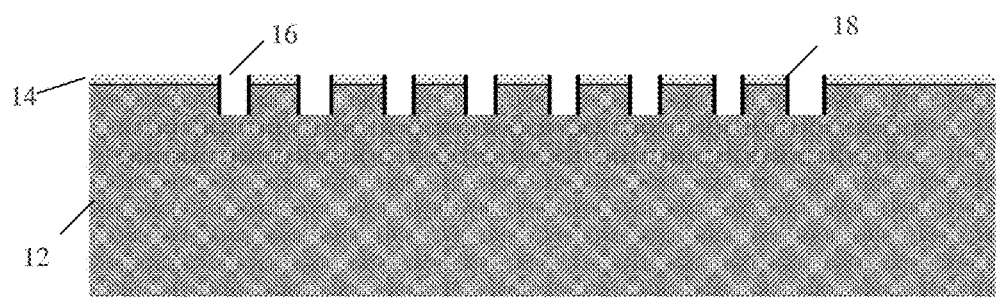

Referring to FIG. 1B, a sidewall liner (also referred to as a spacer) 18 can be formed on the sidewalls of the trenches 16 by depositing a dielectric material and anisotropic etching the dielectric material from the bottom of the trenches 16 and top planar features of the structure. In embodiments, the sidewall liner 18 can be an oxide or nitride, combinations thereof or other dielectric materials, as examples. The sidewall liner 18 can be formed using any known deposition method, e.g., CVD, thermal oxidation of the silicon substrate, atomic layer deposition (ALD) or any of these combinations.

The sidewall liner 18 should robustly coat the sidewalls of the trenches 16 in order to protect the underlying substrate material 12 from subsequent removal (e.g., etching) processes (for cavity formation). To achieve this robust sidewall coverage, the dielectric material should be thick enough to leave a thick film on the sidewalls of the trenches 16, but not too thick that it pinches off the top opening of the trenches 16 which would prevent cavity formation. For example, 40 nm of nitride can be deposited on a 100 nm wide trench. In other embodiments, the sidewall of the trenches 16 can be thermally oxidized to form a $SiO_2$ layer which extends under the pad film(s) 14. Following this thermal oxidization or other deposition process, the sidewall liner 18 can undergo an anisotropic etch. In embodiments, the top surface of the pad film 14 is exposed to the spacer etch and is thinned but not fully removed.

In an example, the anisotropic etch comprises a RIE using a perfluorocarbon-based chemistry which removes material from planar surfaces but leaves dielectric material on the sidewall of the trenches 16 as is known in the art. An optional vapor or liquid HF treatment, hydrogen plasma, anneal, basic or acidic chemical clean, or any process known to remove thin or native dielectrics or residual spacer etch polymer from the substrate 12 (e.g., silicon) can be used to remove any excessive dielectric material at a bottom of the trenches 16. The post sidewall liner etch cleans (e.g., anisotropic etch) should leave a robust dielectric liner 18 on the top corner and sidewall of the trenches 16 to prevent etching of the substrate 12 through the sidewall of the trenches 16 during cavity formation. If a thermal oxide formed in a furnace for the sidewall liner 18 is used, then the substrate 12 under the pad film(s) 14 can be oxidized, which may provide a better protective barrier to prevent unintentional substrate etching during the cavity formation.

Figure 1C:
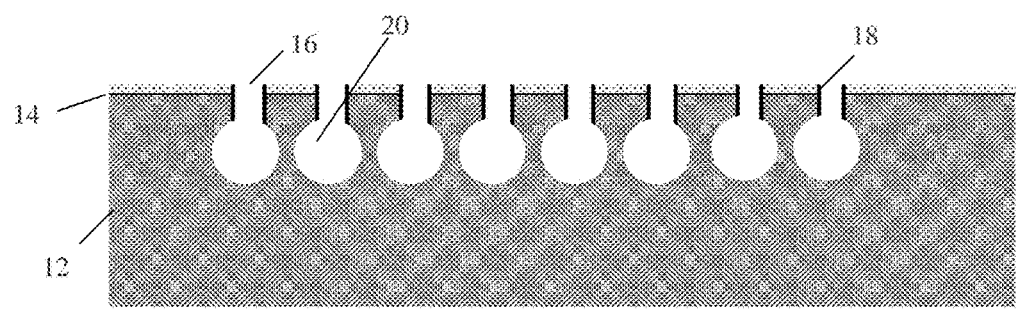
Figure 1D:
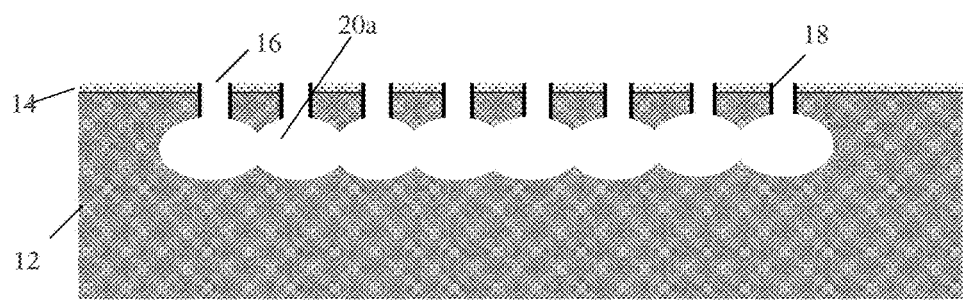

As shown in FIG. 1C, an array of cavity structures 20 can be selectively formed in the substrate 12 by a substrate removal, e.g., etching, process through the bottom of the trenches 16. Alternatively, as shown in FIG. 1D, the array of cavity structures can be over-etched to form a single, merged cavity structure 20a. In either scenario, the pad film(s) 14 on the surface of the substrate 12 and the sidewall liner 18 on the sidewall of the trenches 16 will protect the substrate 12 from being unintentionally etched during the cavity formation.

To form the cavity structures 20, 20a, the exposed substrate material 12 within the trenches 16 can be removed by a wet etching process or dry etching process. For example, dry etchants include plasma-based $CF_4$, plasma-based $SF_6$, or gas $XeF_4$ silicon etch, etc., and wet etching processes include KOH and $NH_4OH$. In embodiments, the upper surface of cavity structure 20 can be about 0.4 μm to 0.7 μm in depth below the top surface of the substrate 12; although the depth can be modulated to increase optimization for different wavelengths. In addition, the cavity structures 20 can have a diameter of about 200 nm to 1.0 μm as an example; although other dimensions are contemplated herein.

Figure 1E:
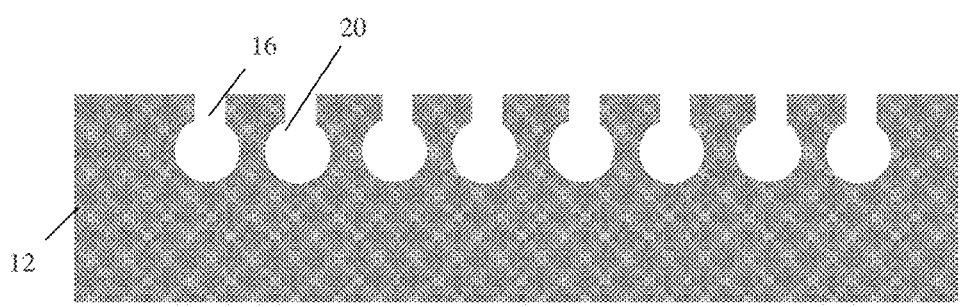
Figure 2A:
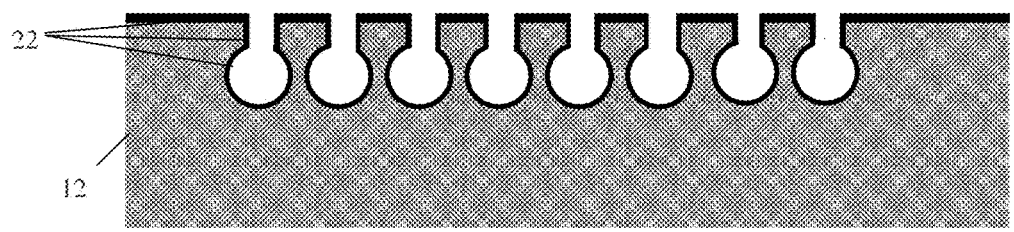
FIG. 2A shows cavity structures lined with epitaxial material, amongst other features, and respective fabrication processes in accordance with aspects of the present disclosure.
Figure 2B:
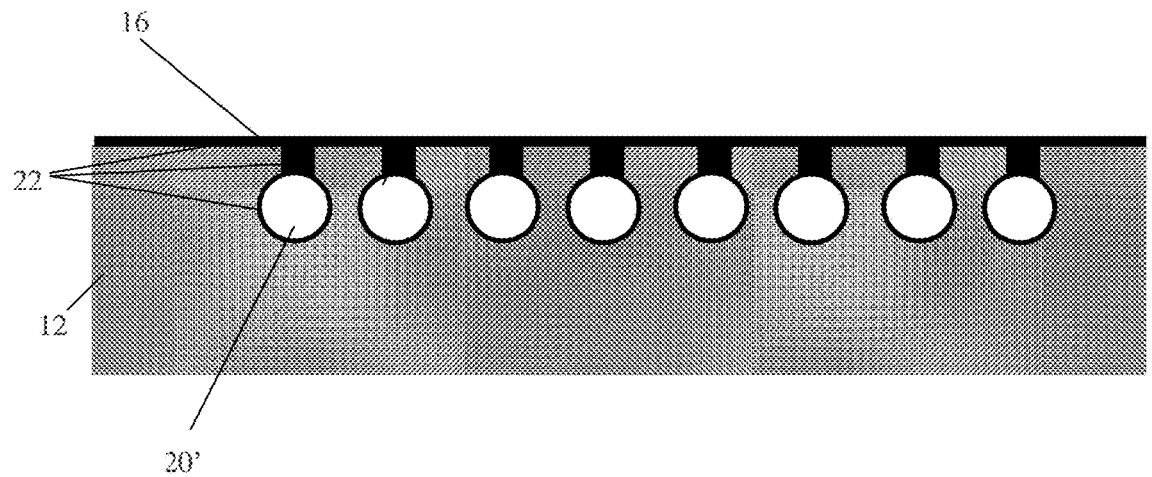
FIG. 2B shows an array of airgap(s) integrated into the substrate, amongst other features, and respective fabrication processes in accordance with aspects of the present disclosure.

In FIG. 1E, the sidewall liner and pad films are removed, exposing the upper surface of the substrate 12 and the sidewalls of the trenches 16. The sidewall liner and pad films can be removed by a conventional etching process selective to such materials. For example, the sidewall liner and pad films can be removed by using only or a combination of hot phosphorous followed by a HF chemistry or vice-versa depending on the single dielectric layer or stack of different dielectric layers used for the sidewall liner. Following the removal of the sidewall liner and pad films, the trenches 22 can be subjected to an optional annealing process to soften or round (curve) the edges of the trenches as is known in the art such that no further explanation is required for a complete understanding of the present disclosure, e.g., a temperature range of about 800° C. to about 1100° C., for up to about 60 seconds in an $H_2$ atmosphere FIGS. 2A and 2B show formation of an array of airgap(s) integrated into the substrate 12, amongst other features. In FIG. 2A, a material 22 can be formed, e.g., deposited, on the surface of the substrate 12 including, e.g., the optional surface of the curvature, sidewalls of the trenches 16 and sidewalls of the cavity structures 20. In embodiments, the material 22 can be epitaxial SiGe deposited using ultra high vacuum CVD (UHVCVD); although other semiconductor materials, polysilicon or epitaxial films, and deposition processes are contemplated herein.

By way of example, SiGe material can be deposited at a temperature of about 600° C. to 750° C., resulting in a thickness of about 5 nm to about 50 nm. It should be understood that other thicknesses of the material 22 can be applied, depending on the critical dimension of the trenches 16. For example, in general, as the width of the trenches 16 increases, the thickness of material 22 increases in order to ensure that the top of the trench 16 is filled or sealed during the subsequent reflow anneal.

As shown in FIG. 2B, the substrate, e.g., material 22, can be heated to equal to or greater than the reflow temperature of the material 22. This reflow temperature reflows the material 22 to fill in the top of trenches 16. Since SiGe has a lower reflow temperature than Si, for example, the material 22 can be reflowed into the opening of the trenches 16 to plug or fill the top of the trenches 16 without filling in the cavity structures 20. In embodiments, the reflow temperature can be about 800° C. to 1050° C. and the reflow time can be anywhere up to about 600 seconds. By providing the reflow process, the top of the trench 16 is fully sealed with the material 22, thereby forming, e.g., airgaps 20'. In embodiments, the airgaps 20' can be circular (spheres), oval, cylindrical, a single, merged airgap (FIG. 1D), etc. Moreover, the array of airgaps 20' can have a constant pitch (e.g., periodic) or non-periodic pitch (e.g. apodized).

In optional embodiments, a silicon layer can be deposited to a thickness of about 150 nm in a deposition chamber having a temperature of about 850° C. to about 1050° C. for about 60 seconds. At this temperature, the SiGe material 22 continues to reflow, continuing to gravitate or migrate into the upper portion of the trenches 16 (e.g., typically at the smallest critical dimension). The semiconductor material may also reflow during the bake, filling in the increased volume at the top of the trench and resulting in a planar or nearly planar surface. This reflow also assists in sealing the trenches 16, thereby forming the airgaps 20'.

Figure 3:
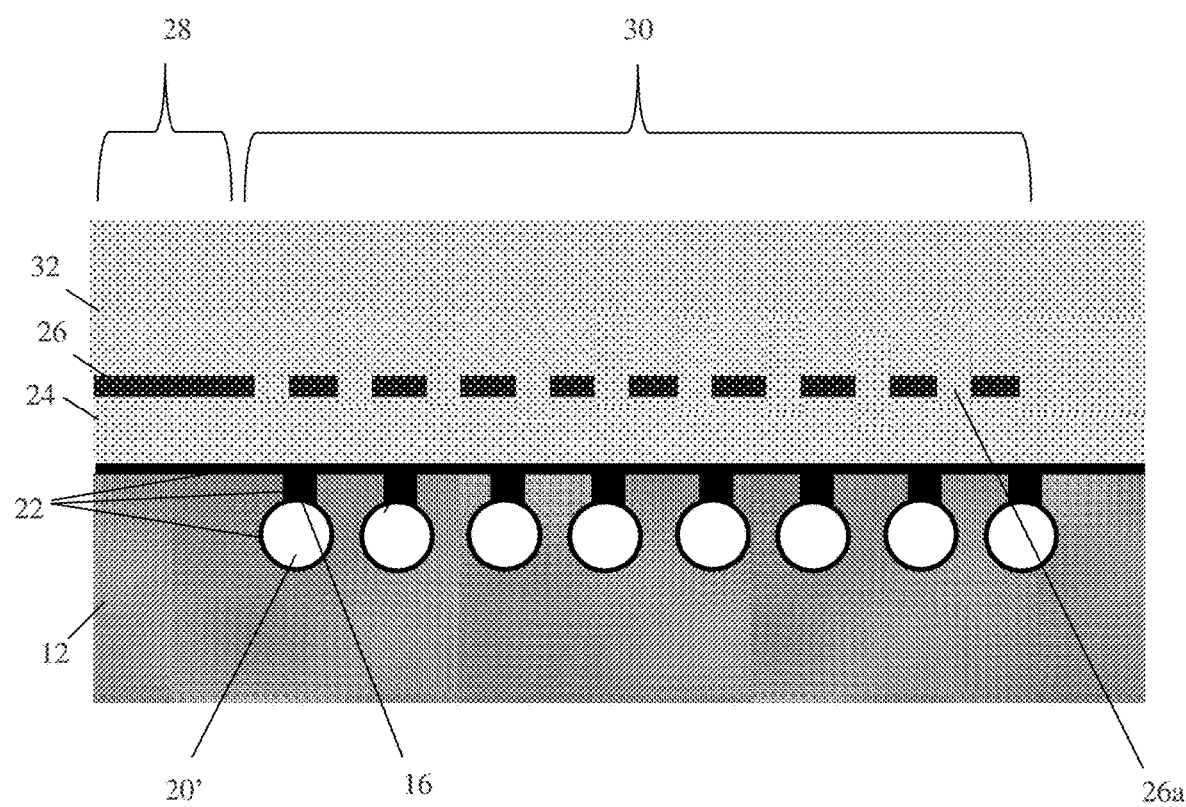
FIG. 3 shows a grating coupler over the array of airgap(s), amongst other features, and respective fabrication processes in accordance with aspects of the present disclosure.

FIG. 3 shows a grating coupler formed over the airgap(s) 20', amongst other features. More specifically, a dielectric material 24 can be formed, e.g., deposited, over the sealed airgaps 20'. The dielectric material 24 can be, e.g., an oxide material, deposited by a conventional deposition method, e.g., CVD process. A waveguide material 26 can be formed e.g., deposited, on the dielectric material 24. In embodiments, the waveguide material 26 can be, e.g., SiN, deposited by a CVD process. In embodiments, the material thickness of the waveguide material 26 can be, e.g., 200 nm to 500 nm.

The waveguide material 26 can be patterned using conventional lithography and etching processes to form a waveguide structure 28 and a grating coupler 30. The pattern of the grating coupler 30 comprises a plurality of openings 26a which can be aligned with the airgaps 20', offset from the airgaps 20' or combinations thereof, depending on the desired performance parameters of the waveguide structure 28. The openings 26a can also be of different shapes, e.g., rectangular, square, etc. In any scenario, the plurality of openings 26a are positioned such that light can pass through the grating coupler 30, reach to the airgaps 20', and reflect back to the waveguide structure 28 to optimize coupling efficiency of the waveguide structure 28.

Still referring to FIG. 3, a dielectric material 32 can be deposited over the waveguide material 26, e.g., waveguide structure 28 and grating coupler 30. The dielectric material 28 can be, e.g., an oxide material, deposited by a conventional deposition method, e.g., CVD process.

Figure 4:
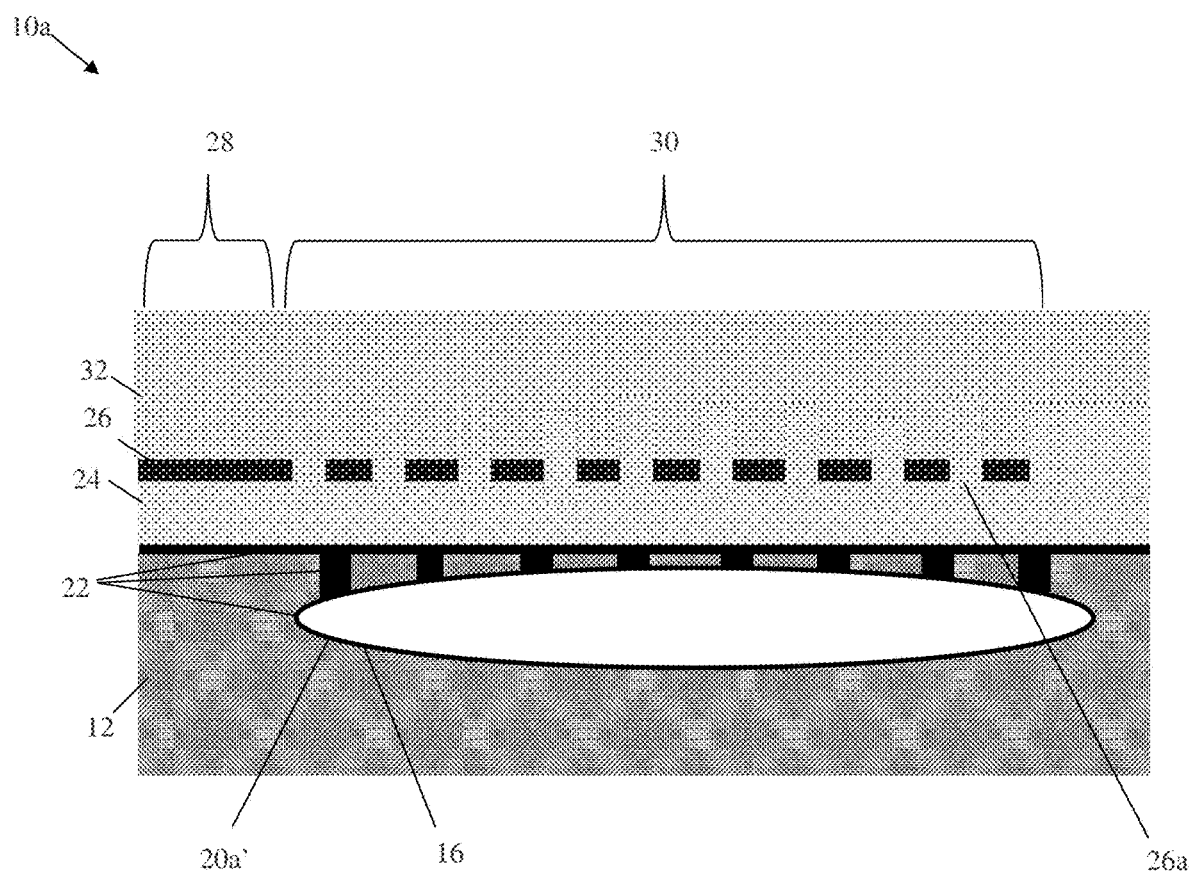
FIG. 4 shows a grating coupler over a single, merged airgap, amongst other features, and respective fabrication processes in accordance with aspects of the present disclosure.

FIG. 4 shows a structure 10a comprising a grating coupler 30 with a single airgap 20a' integrated into the substrate 12.

The single airgap 20a' can be formed by merging the cavity structures described in FIG. 1D, followed by the remaining processes described in FIGS. 1E-2B. In this embodiment, the airgap 20a' is below the waveguide structure 28 and the grating coupler 30. Also, through modeling, it has been shown that coupling efficiency of the structure 10a increases significantly over a process of record, e.g., a structure which does not include any airgaps features over the grating coupler of the waveguide structure.

Figure 5:
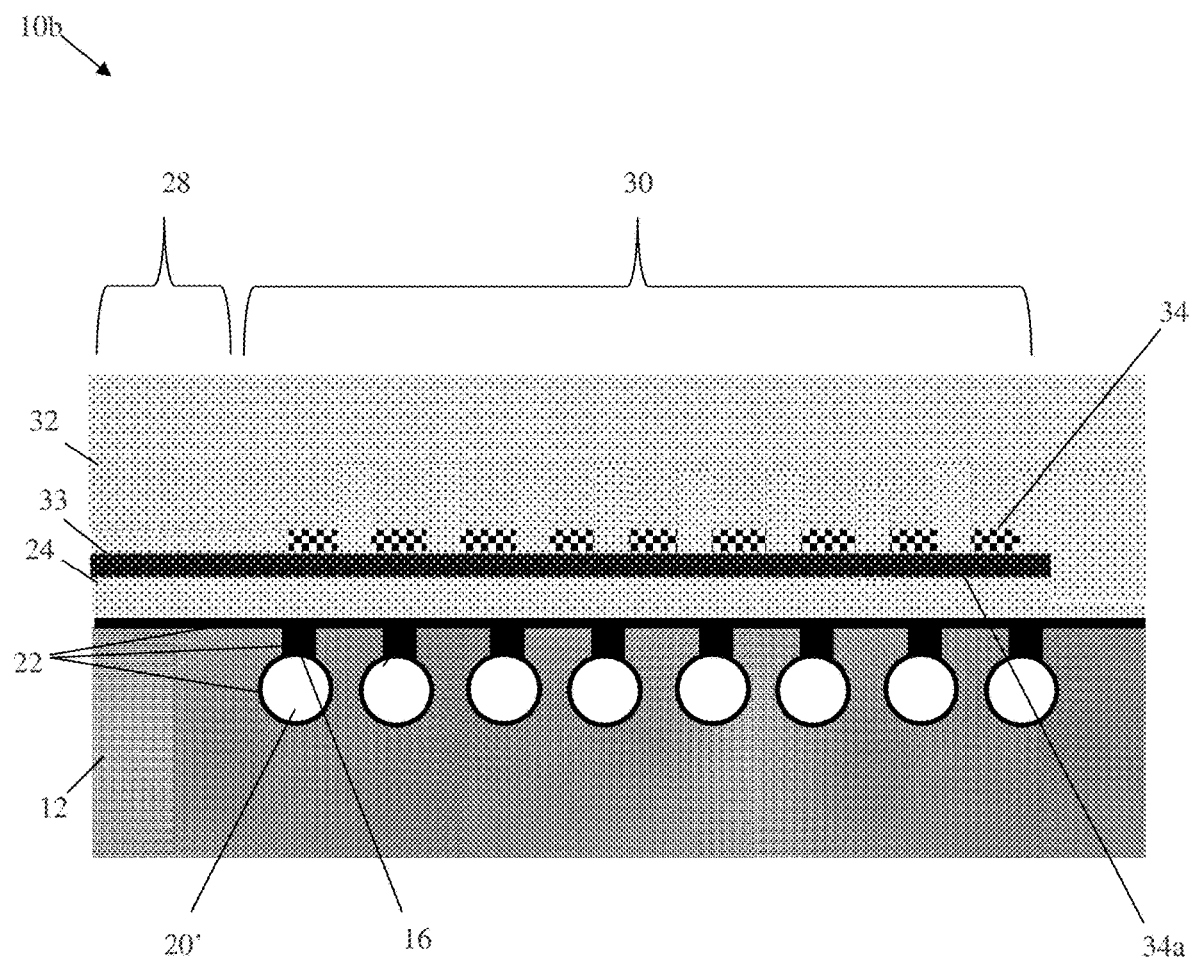
FIG. 5 shows a polysilicon grating coupler over the array of airgap(s), amongst other features, and respective fabrication processes in accordance with aspects of the present disclosure.

FIG. 5 shows a structure 10b comprising a polysilicon grating coupler 30 integrated with an array of airgaps 20' as shown in FIG. 3. In this embodiment, the waveguide structure 28 can be composed of Si material 33 and the grating coupler 30 includes polysilicon material 34 patterned over the Si material 33. In the fabrication process, as an example, the Si material 33 and polysilicon material 34 can be deposited by any conventional deposition method such as, CVD, with the polysilicon material 34 deposited over the Si material 33. The polysilicon material 34 can be patterned using conventional lithography and etching processes as already described herein. As in the any of the embodiments, the grating coupler 30 (e.g., patterned poly material) can comprise any number of different patterns, e.g., shapes or openings 34a.

Figure 6:
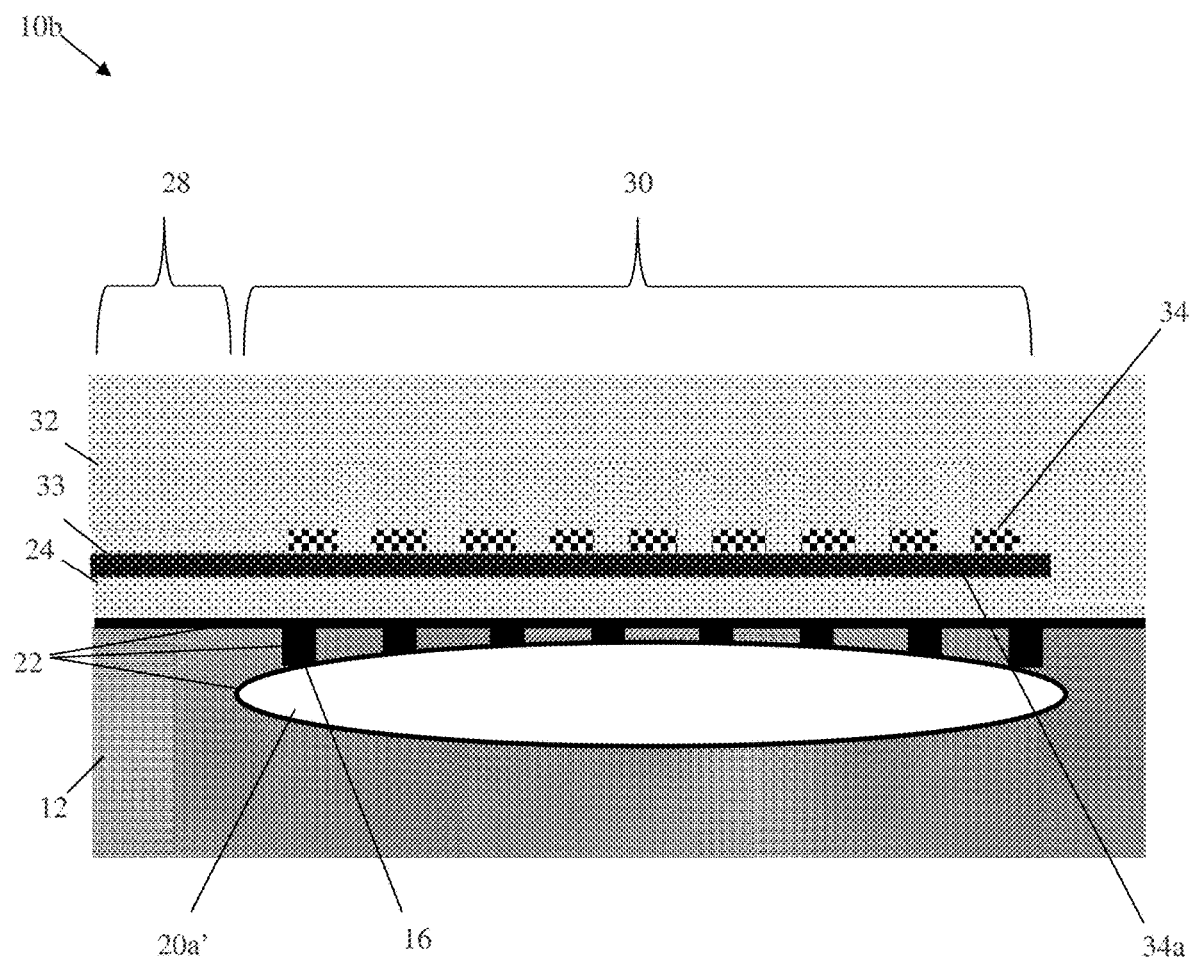
FIG. 6 shows a polysilicon grating coupler over a single, merged airgap, amongst other features, and respective fabrication processes in accordance with aspects of the present disclosure.

FIG. 6 shows a structure 10c comprising a grating coupler 30 with a single airgap 20a' integrated into the substrate 12. The single airgap 20a' can be formed by merging the cavity structures described in FIG. 1D, followed by the remaining processes described in FIGS. 1E-2B. In this embodiment, the grating coupler 30 includes polysilicon material 34 patterned over Si material 33 as described with respect to FIG. 5, with the waveguide structure 28 comprising the Si material 33. However, in this embodiment, only a single airgap 20a' can be formed in the underlying substrate 12, such as by merging the cavities described in FIG. 1D.

Figure 7:
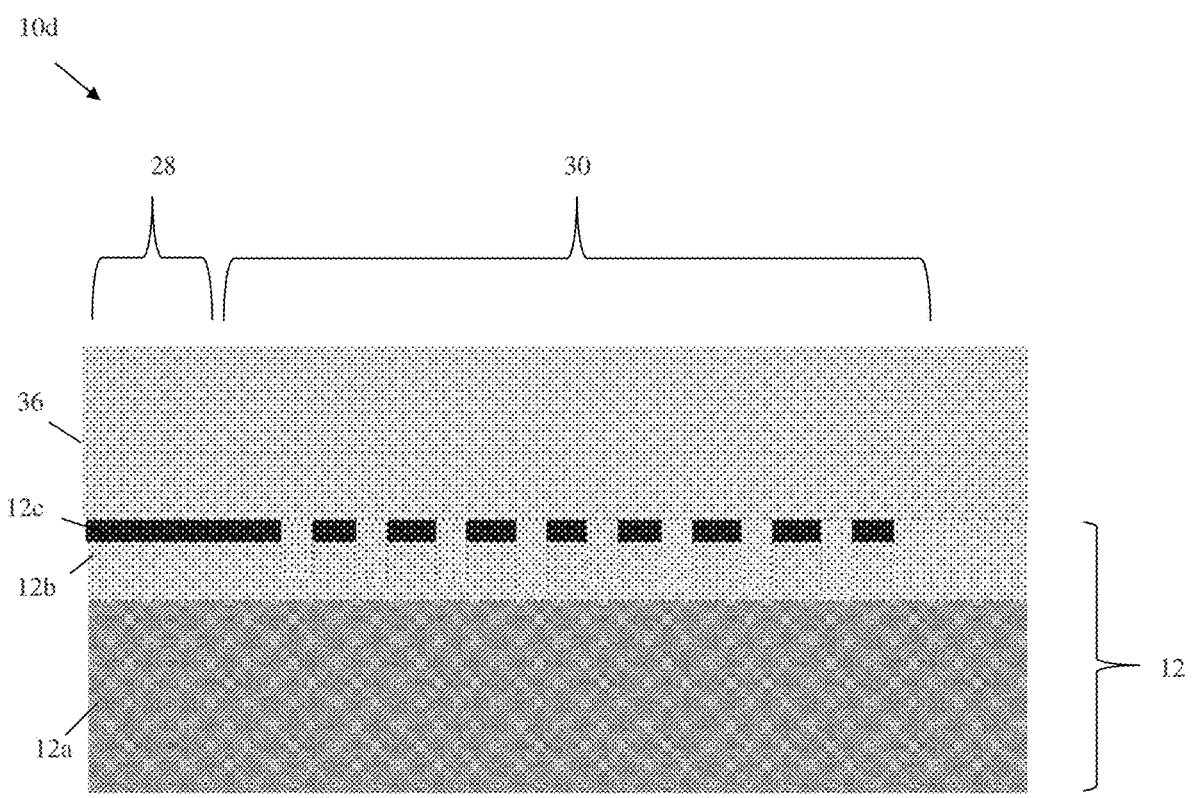
FIG. 7 shows a grating coupler integrated in semiconductor on insulator (SOI) technology, amongst other features, and respective fabrication processes in accordance with additional aspects of the present disclosure.

FIG. 7 shows a grating coupler formed using SOI technology, amongst other features, and respective fabrication processes. More specifically, the structure 10d of FIG. 7 shows a grating coupler 30 and waveguide structure 28 formed from semiconductor material 12c of the SOI technology 12. As should be understood by those of skill in the art, the SOI technology 12 comprises a substrate (wafer) 12a, an insulator layer 12b (e.g., buried oxide layer) over the substrate 12a, and a semiconductor material 12c over the insulator material 12b. The semiconductor material 12c can be any appropriate semiconductor material such as Si or SiN; although other semiconductor materials are contemplated herein.

Still referring to FIG. 7, the grating coupler 30 and waveguide structure 28 can be formed by a patterning process, e.g., lithography and etching (RIE) of the semiconductor material 12c, as already described herein such that no further explanation is required for an understanding of the present disclosure. In alternative processes, the grating coupler 30 can be formed by using a polysilicon material patterned over the semiconductor material 12c, as discussed with reference to FIG. 5, for example. In even further alternative embodiments, the grating coupler 30 and waveguide structure 28 can be formed by deposited and patterning a separate semiconductor material (e.g., SiN) over a dielectric material deposited on the semiconductor material 12c. In any scenario, a cladding layer 36 is deposited on the grating coupler 30 and waveguide structure 28. In embodiments, the cladding layer 36 is Undoped Silicate Glass (USG).

Figure 8A:
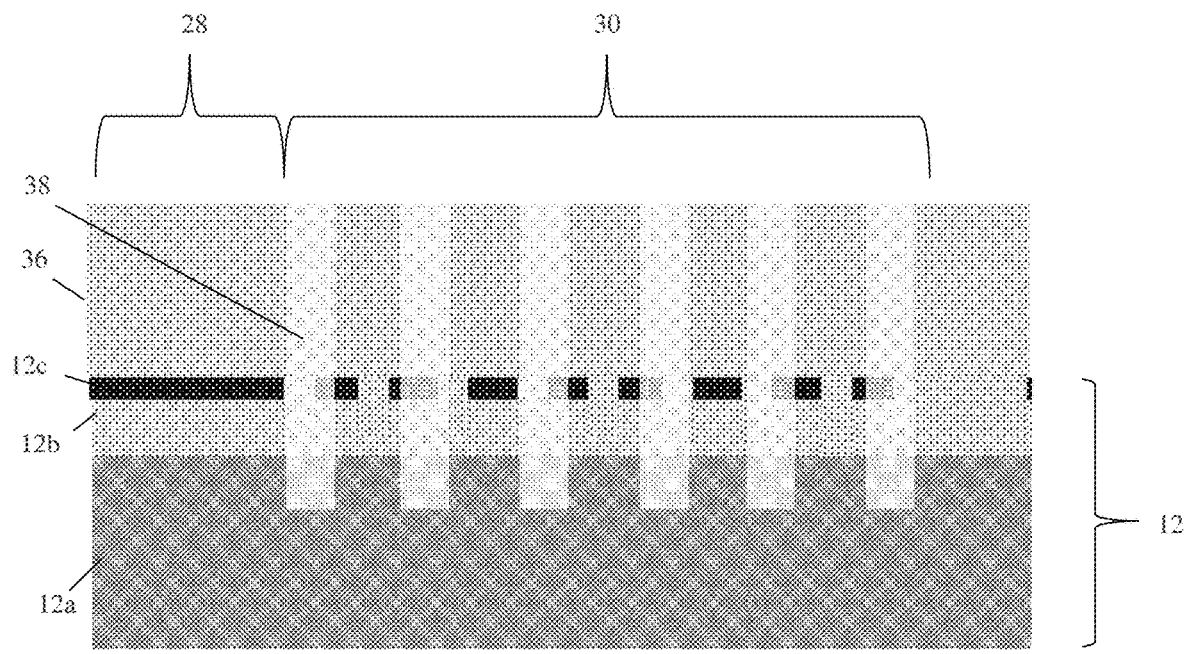
FIGS. 8A and 8B show trenches on sides of the grating coupler and extending into the substrate of the SOI technology, amongst other features, and respective fabrication processes in accordance with aspects of the present disclosure.
Figure 8B:
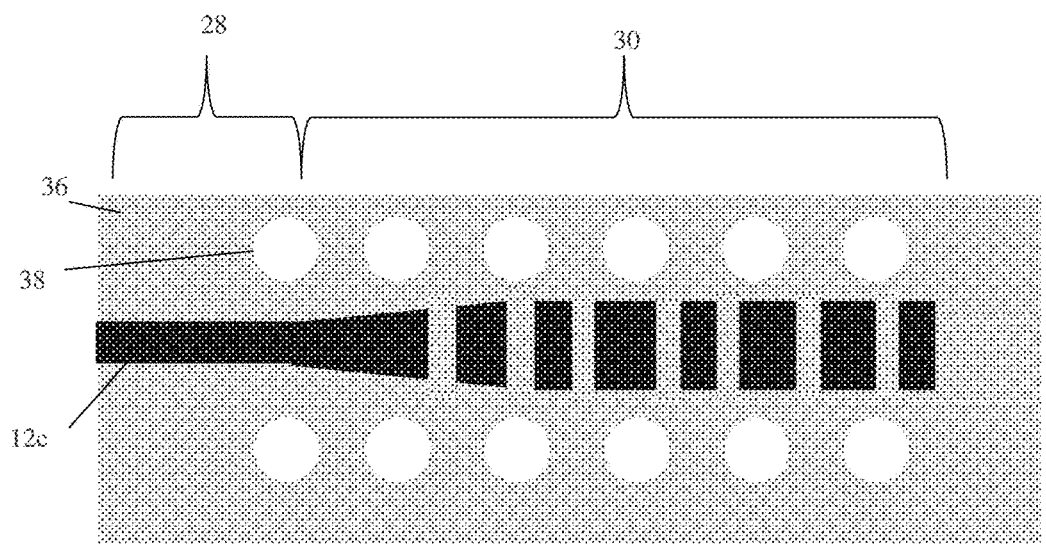

FIG. 8A shows a cross-sectional view of trenches 38 formed on sides of the grating coupler 30 and extending into the semiconductor material 12c of the SOI technology. FIG. 8B is a top down view of FIG. 8A. More specifically, trenches 38 can be formed on both sides of the grating coupler 30 and extend into the semiconductor material 12c. The trenches 38 can be formed by conventional lithography and etching processes using selective chemistries for the different materials, e.g., cladding material 38, insulator material 12b and substrate 12a.

Figure 9A:
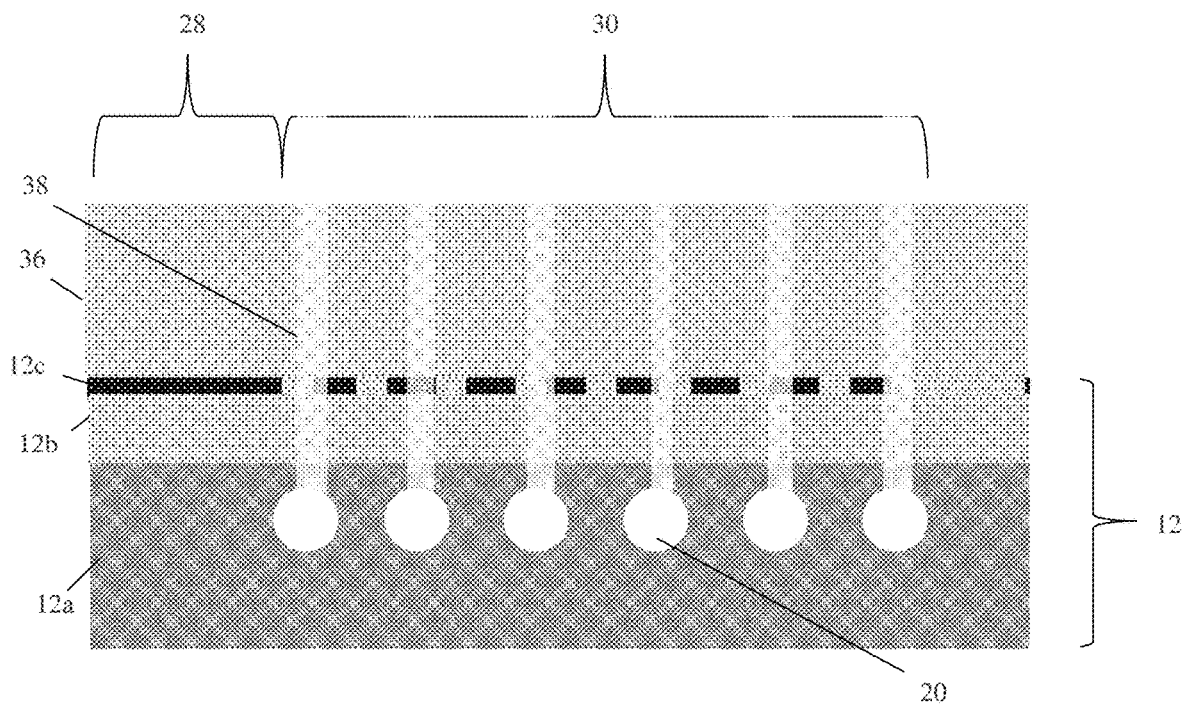
FIGS. 9A and 9B show cavity structures in the substrate of the SOI technology, amongst other features, and respective fabrication processes in accordance with aspects of the present disclosure.
Figure 9B:
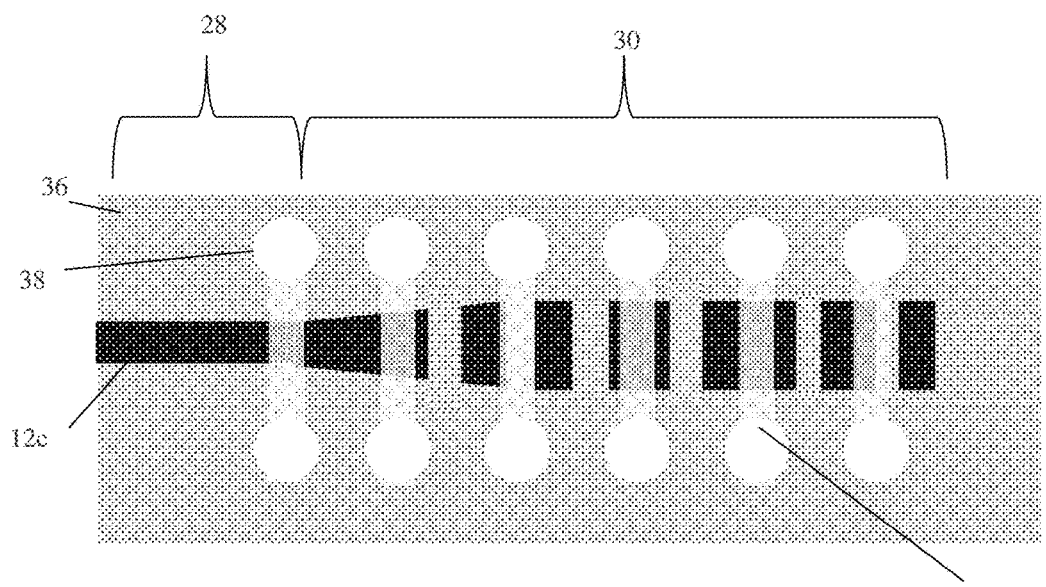

FIG. 9A shows a cross-sectional view of cavity structures 20 formed underneath the grating coupler 30, within the substrate 12a. FIG. 9B is a top down view of FIG. 9A. More specifically, using an etching process on the exposed and substrate 12a, cavity structures 20 are formed within the substrate 12a, underneath the grating coupler 30. The cavity structures 20 can be formed with a selective chemistry to the substrate 12a, i.e., the remaining materials block etching processes from occurring at other locations. In embodiments, the substrate 12a can be over-etched to merge the cavity structures 20 into a single cavity structure. As already described herein, the etching process can be a wet etching process or dry etching process.

Figure 10:
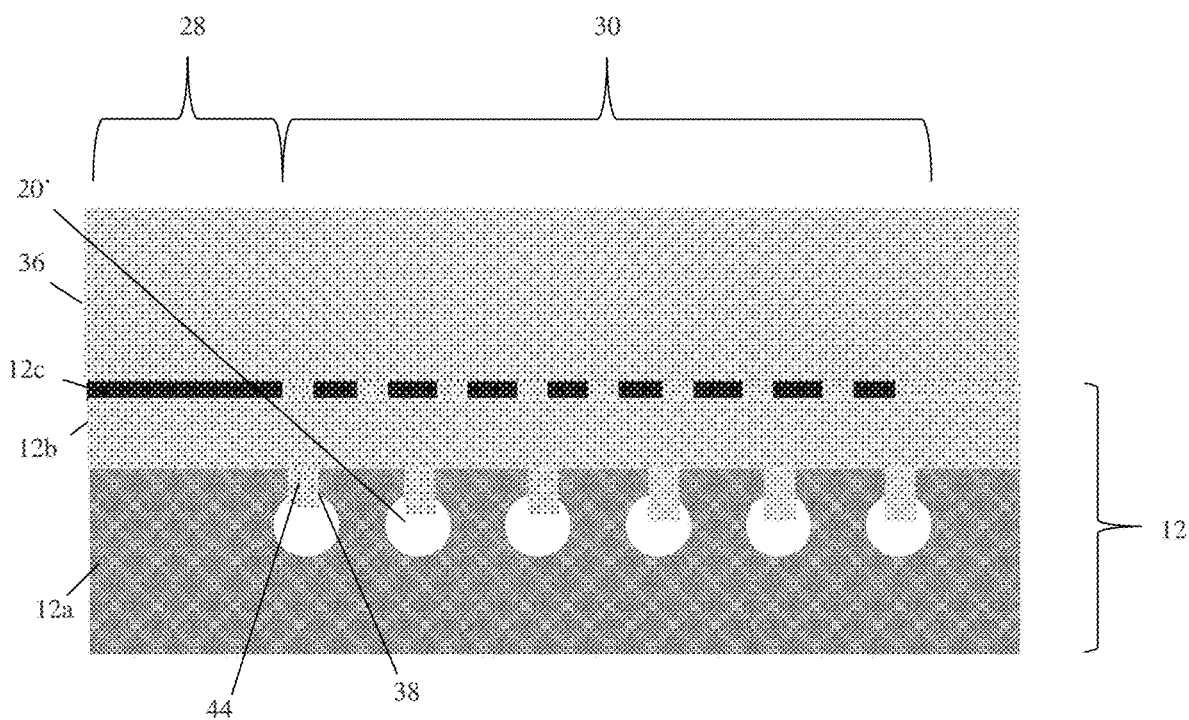
FIG. 10 shows an array of airgaps under the grating coupler, amongst other features, and respective fabrication processes in accordance with aspects of the present disclosure.

FIG. 10 shows an array of airgaps 20' formed under the grating coupler 30, amongst other features. In embodiments, the array of airgaps 20' can be formed by depositing material 44 into the trenches 38 in order to seal the trenches 38. Prior to sealing the airgaps 20', an optional cleaning process of the cavity structures can be performed as already described herein. In embodiments, the material 44 can be a dielectric material deposited by a conventional CVD process. As should be understood by those of skill in the art, the dielectric material will result in a pinch off phenomena.

In optional embodiments, prior to cavity formation, a sidewall liner (also referred to as a spacer) can be formed on the sidewalls of the trenches, preferably on the exposed substrate material 12a, followed by an anisotropic etching process to expose a bottom surface of the trenches, as already described herein. After the airgap formation described in FIG. 10, the sidewall liner can be removed by a conventional etching process selective to such materials.

Figure 11:
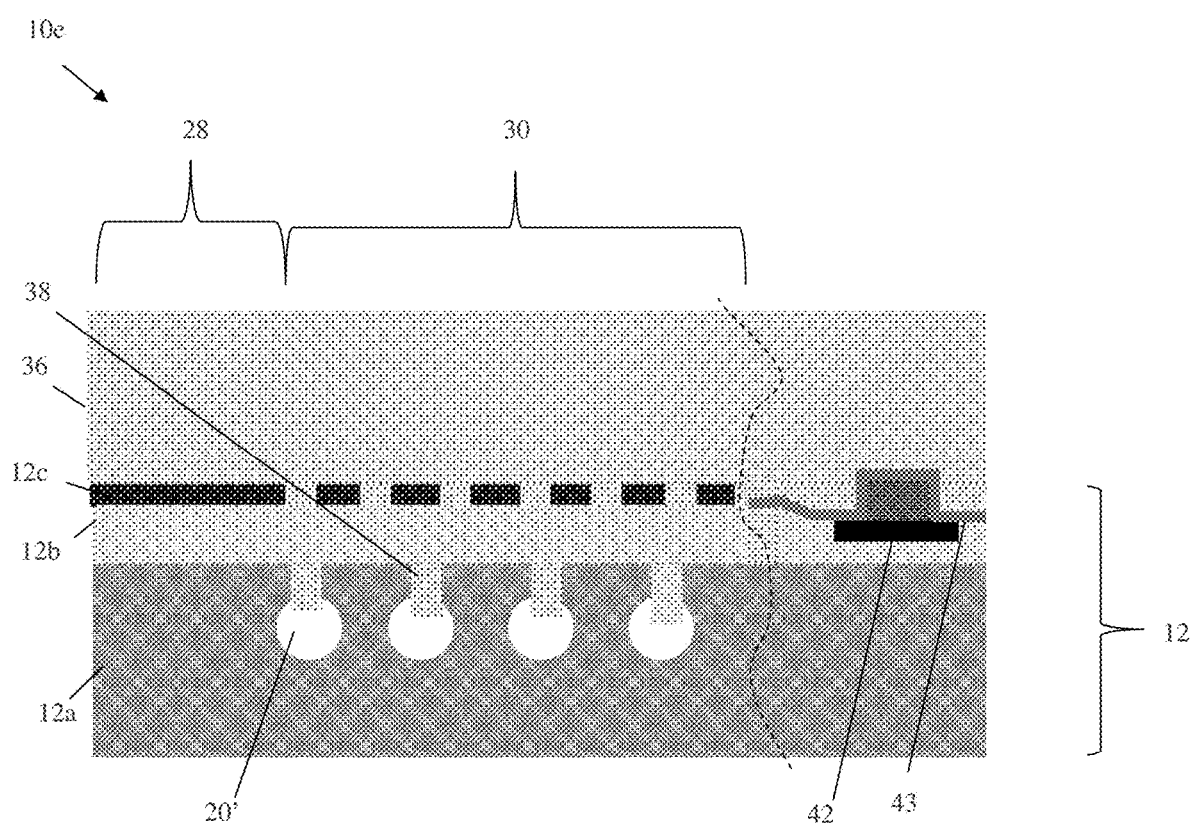
FIG. 11 shows a CMOS device integrated with the grating coupler in SOI technology, amongst other features, and respective fabrication processes in accordance with aspects of the present disclosure.

FIG. 11 shows a structure 10e comprising a CMOS device 42 fully integrated with the grating coupler 30 and waveguide structure 28, using SOI technology, amongst other features. In embodiments, the CMOS device 42 can be an active or passive device. For example, the active device can be a transistor with a nitride liner 43; whereas, the passive device can be a resistor or capacitor, amongst other types of device.

The grating couplers with airgaps can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
a substrate material comprising one or more airgaps; and
a grating coupler disposed over the substrate material and the one or more airgaps,
wherein the one or more airgaps comprises a plurality of airgaps with spaces comprising a non-periodic pitch under the grating coupler.

2. The structure of claim 1, wherein the substrate material comprises bulk Si material.

3. The structure of claim 1, wherein the grating coupler comprises a plurality of openings aligned with the one or more airgaps.

4. The structure of claim 1, wherein the grating coupler comprises a plurality of openings offset from each of the one or more airgaps.

5. The structure of claim 1, wherein epitaxial material seals the one or more airgaps and the substrate comprises Si.

6. The structure of claim 1, wherein the grating coupler comprises polysilicon material patterned on a semiconductor material.

7. The structure of claim 1, wherein the substrate material comprises a substrate of semiconductor-on-insulator (SOI) technology and the grating coupler comprises patterned semiconductor material of the SOI technology.

8. The structure of claim 1, wherein the substrate material comprises a substrate of semiconductor-on-insulator (SOI) technology and the grating coupler comprises patterned polysilicon material on semiconductor material of the SOI technology.

9. The structure of claim 1, wherein the one or more airgaps extend between trenches provided on opposing sides of the grating coupler.

10. A structure comprising:
a bulk substrate material comprising one or more sealed airgaps within the bulk substrate material;
a waveguide structure over the bulk substrate material; and
a grating coupler optically coupled to the waveguide structure and disposed over the one or more airgaps,
wherein spaces are provided between the one or more sealed airgaps at a constant pitch.

11. The structure of claim 10, wherein the bulk substrate material comprises Si material and the waveguide structure and the grating coupler comprise a same semiconductor material.

12. The structure of claim 10, wherein SiGe material seals the one or more sealed airgaps.

13. The structure of claim 10, wherein the grating coupler comprises polysilicon material patterned on a semiconductor material and the waveguide structure comprises the semiconductor material.

14. The structure of claim 10, wherein the bulk substrate material comprises a substrate of semiconductor on insulator (SOI) technology, the grating coupler comprises patterned semiconductor material of the SOI technology, and the one or more airgaps extend between trenches provided on opposing sides of the grating coupler.

15. A method comprising:
   forming one or more sealed airgaps in a bulk substrate material; and
   forming a grating coupler over the bulk substrate material and the one or more airgaps.

* * * * *